US010104536B2

(12) United States Patent
Ryan et al.

(10) Patent No.: US 10,104,536 B2
(45) Date of Patent: Oct. 16, 2018

(54) METHOD AND SYSTEM FOR USER EQUIPMENT IDENTIFICATION IN A NETWORK

(71) Applicant: GeoVisible, Inc., Seattle, WA (US)

(72) Inventors: David James Ryan, Jackson, WY (US); Charles James Judson, Seattle, WA (US)

(73) Assignee: GeoVisible, Inc., Seattle, WA (US)

( * ) Notice: Subject to any disclaimer, the term of this patent is extended or adjusted under 35 U.S.C. 154(b) by 0 days.

(21) Appl. No.: 15/976,801

(22) Filed: May 10, 2018

(65) Prior Publication Data

US 2018/0262903 A1    Sep. 13, 2018

Related U.S. Application Data

(63) Continuation-in-part of application No. 15/644,622, filed on Jul. 7, 2017, which is a continuation-in-part of application No. 15/201,168, filed on Jul. 1, 2016, now Pat. No. 9,918,212.

(60) Provisional application No. 62/360,173, filed on Jul. 8, 2016, provisional application No. 62/190,450, filed on Jul. 9, 2015, provisional application No. 62/190,445, filed on Jul. 9, 2015.

(51) Int. Cl.
*H04W 24/00* (2009.01)
*H04W 8/22* (2009.01)
*H04W 36/00* (2009.01)
*H04W 4/021* (2018.01)

(52) U.S. Cl.
CPC ............. *H04W 8/22* (2013.01); *H04W 4/021* (2013.01); *H04W 36/0083* (2013.01)

(58) Field of Classification Search
None
See application file for complete search history.

(56) References Cited

U.S. PATENT DOCUMENTS

2015/0111524 A1*  4/2015  South ..................... H04W 4/90
                                                                         455/404.2

* cited by examiner

*Primary Examiner* — Suhail Khan

(57) ABSTRACT

A method for identifying a target user equipment (UE) in a cellular telecommunications network includes receiving a plurality of time and position coordinate pairs including first and second coordinate pairs, establishing a plurality of geofences, each geofence of the plurality of geofences corresponding to one time and position coordinate pair of the plurality of time and position pairs, for each geofence, determining at least one cell that provides service to the geofenced area, determining a set of UE identities for the at least one cell at the time of the associated coordinate pair, and correlating the sets of UE identifiers for each of the plurality of coordinate pairs to determining at least one UE identifier that occurs at a highest frequency for each of the coordinate pairs. Identities may be received in response to a request to change a Location Area Code (LAC) or a Tracking Area Code (TAC).

20 Claims, 8 Drawing Sheets

METHOD AND SYSTEM FOR USER EQUIPMENT IDENTIFICATION IN A NETWORK

CROSS-REFERENCES TO RELATED APPLICATIONS

The present disclosure is a continuation-in-part of U.S. patent application Ser. No. 15/644,622, filed on Jul. 7, 2017 which is continuation-in-part of U.S. patent application Ser. No. 15/201,168, filed on Jul. 1, 2016, now U.S. Pat. No. 9,918,212 which in turn claims priority to U.S. Provisional Application No. 62/190,450, filed Jul. 9, 2015 and to U.S. Provisional Application No. 62/190,445, filed Jul. 9, 2015, and the present disclosure claims priority to U.S. Provisional Application No. 62/360,173, filed Jul. 8, 2016, each of which are incorporated by reference herein for all purposes.

BACKGROUND

Cellular networks are typically capable of determining the locations of User Equipment (UE). Location information for a UE can be used for many purposes, such as delivering location-specific information to users. One field that benefits from accurate location information for UEs is emergency services.

There are many challenges associated with determining locations for UEs. Multiple operators provide cellular service to the same geographic areas, so mechanisms that are limited to a single network can only discover a fraction of UEs that are present in a given area. In addition, a portion of the UEs are in idle mode at any given time, which limits the extent to which the UEs can communicate.

In support of public safety, there may be situations during which it would be helpful to identify the wireless network identity of mobile user equipment devices in motion throughout the network. One such scenario could occur when a public safety officer such as a police officer is following a vehicle of interest (e.g. suspect, witness, possible abduction victim, etc.) and would like to identify any wireless mobile devices (e.g. cell phones, wireless equipped tablets, etc.) that are operational within the vehicle being followed.

In the event of a disaster, it can be very difficult to identify persons affected by the disaster. Search and rescue operations are typically manual operations, and can benefit from as much information as possible.

TECHNICAL FIELD

This disclosure provides a system and methods for identifying a mobile device network identity, such as an ESN or IMSI, of mobile devices whose movements are correlated with a set of time and position values.

BRIEF SUMMARY

Embodiments of this disclosure provide a method and system for identifying user equipment in a cellular telecommunications network. User equipment may be identified with respect to a path of a user, an event, or manually input time and position data.

In an embodiment, a method for identifying a target user equipment (UE) in a cellular telecommunications network includes receiving a plurality of time and position coordinate pairs including first and second coordinate pairs, establishing a plurality of geofences, each geofence of the plurality of geofences corresponding to one time and position coordinate pair of the plurality of time and position pairs, for each geofence, determining at least one cell that provides service to the geofenced area, for the at least one cell of each geofence, determining a set of UE identities for the at least one cell at the time of the associated coordinate pair, and correlating the sets of UE identifiers for each of the plurality of coordinate pairs to determining at least one UE identifier that occurs at a highest frequency for each of the coordinate pairs.

In an embodiment, the method includes transmitting a request to change a location area identifier value to a base station of the at least one cell and receiving an identity of at least one UE in idle mode when the location area identifier is changed wherein the received identity of the at least one UE is in the set of UE identities. The location area identifier may be a Location Area Code (LAC) or a Tracking Area Code (TAC), and the request to change the location area identifier may be transmitted at the time of the first coordinate pair.

In an embodiment, the method includes accessing handover records for the at least one cell of each geofence, wherein the set of UE identities includes an identity of at least one UE that was handed over to or from the at least one cell. The method may further include accessing handover records for the at least one cell of each geofence, wherein the set of UE identities includes an identity of at least one UE that was handed over to or from the at least one cell. In such an embodiment, the handover records may be records for handovers to and from the at least one cell within a predetermined time period from the time of an associated time and position coordinate pair.

In an embodiment, the time and position coordinate pairs are provided by an emergency responder. The time and position coordinate pairs may correspond to times and positions of the emergency responder.

In an embodiment, a method for identifying a target user equipment (UE) in a cellular telecommunications network includes receiving a plurality of time and position coordinate pairs including first and second coordinate pairs, establishing a plurality of geofences, each geofence of the plurality of geofences corresponding to one time and position coordinate pair of the plurality of time and position pairs, for each geofence, determining at least one cell that provides service to the geofenced area, for the at least one cell of each geofence, determining a set of UE identities for the at least one cell at the time of the associated coordinate pair by accessing cell association records for the at least one cell of each geofence, accessing handover records for the at least one cell of each geofence, transmitting a request to change a location area identifier value to a base station of the at least one cell and receiving an identity of at least one UE in idle mode when the location area identifier is changed, and correlating the sets of UE identifiers for each of the plurality of coordinate pairs to determining at least one UE identifier that occurs at a highest frequency for each of the coordinate pairs, wherein the set of UE identities includes an identity of at least one UE that was handed over to or from the at least one cell, and wherein the received identity of the at least one UE in idle mode is in the set of UE identities. The first list may include UEs that are registered to cellular networks that are controlled by different operators.

In an embodiment, a process for identifying an unidentified target user equipment (UE) that is in proximity to a searching UE over time in a cellular telecommunications network includes creating a first list that includes identities of a first plurality of UEs when the searching UE is at a first location, sequentially creating a plurality of second lists after first list, each of the second lists including identities of UEs, at least one of the second lists being captured when the searching UE is in a different location from the first location, and correlating data associated with UE identifiers in the first list and the plurality of second lists to determine at least one UE identifier that has a highest probability of being in proximity to the searching UE as the target UE.

In an embodiment, before capturing the first list, the process includes transmitting a request to change a location area identifier value to one or more operator network and receiving an identity of at least one UE in idle mode when the location area identifier is changed, wherein the received identity of the at least one UE is recorded on the first list. Requests to change the location area identifier values may be transmitted before each of the second lists is created.

In an embodiment, the location area identifier is a Location Area Code (LAC) or a Tracking Area Code (TAC).

The process may include creating a first geofenced region in proximity to the searching UE, wherein the first list includes identities of all UEs detected within the first geofenced region.

The process may further include generating a plurality of geofenced regions based on sequential current locations of the searching UE, wherein each of the plurality of second lists includes identities of UEs that are within one of the respective geofenced regions. In an embodiment, the plurality of second lists include handover data for each of the first plurality of UEs on the first list, and correlating the data includes correlating handover data for each of the first plurality of UEs with handover data for the searching UE.

In an embodiment, the first list and each of the plurality of second lists includes identities of all UEs associated with respective cells that are associated with the searching UE when the respective lists are captured.

Correlating the data may include counting a number of second lists on which each UE other than the searching UE appears, and the first list may include UEs that are registered to cellular networks that are controlled by different operators.

DETAILED DESCRIPTION

A detailed description of embodiments is provided below along with accompanying figures. The scope of this disclosure is limited only by the claims and encompasses numerous alternatives, modifications and equivalents. Although steps of various processes are presented in a particular order, embodiments are not necessarily limited to being performed in the listed order. In some embodiments, certain operations may be performed simultaneously, in an order other than the described order, or not performed at all.

Numerous specific details are set forth in the following description in order to provide a thorough understanding. These details are provided for the purpose of example and embodiments may be practiced according to the claims without some or all of these specific details. For the purpose of clarity, technical material that is known in the technical fields related to this disclosure has not been described in detail so that the disclosure is not unnecessarily obscured.

Figure 1:
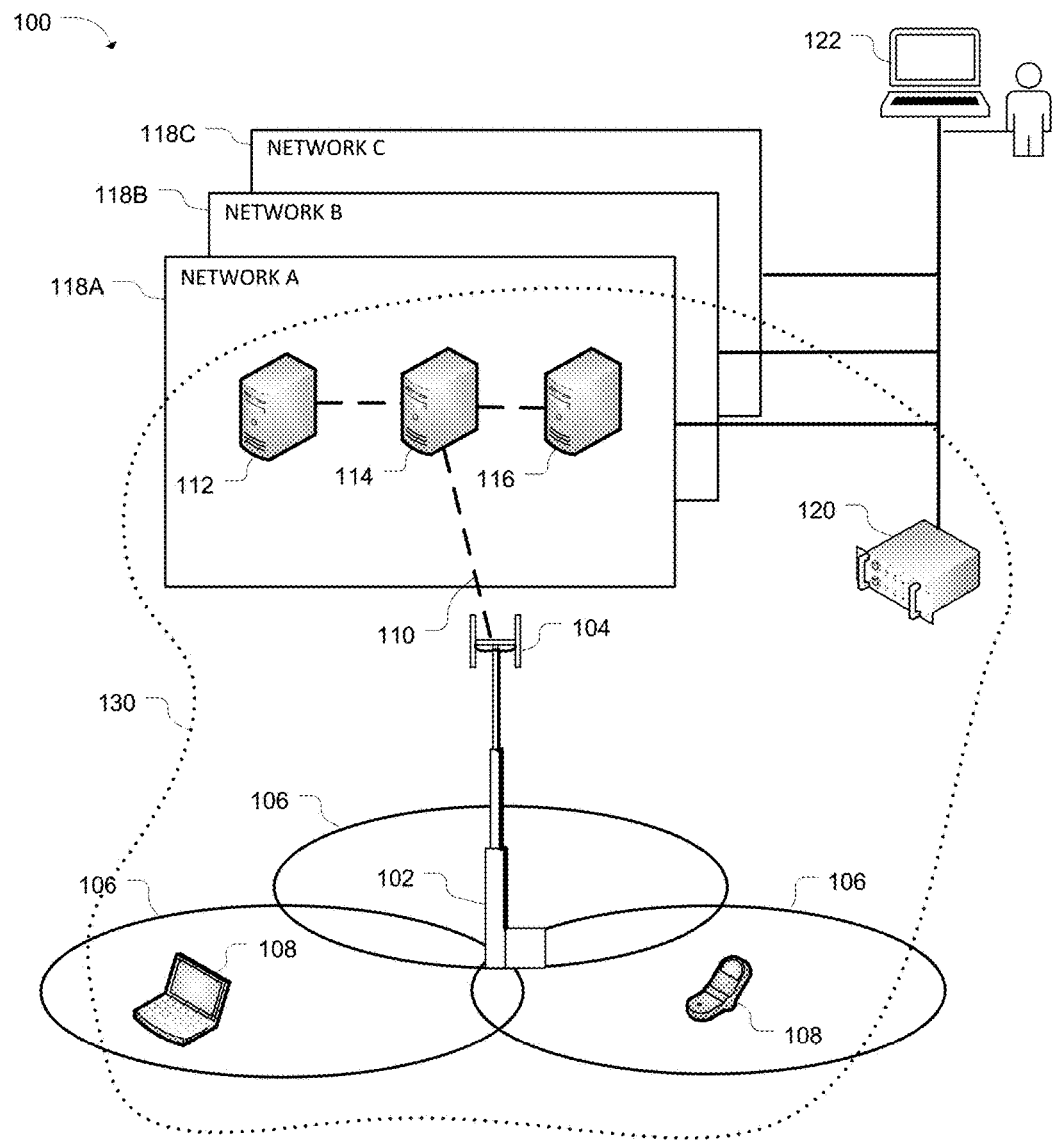
FIG. 1 illustrates a wireless communications system according to an embodiment.

FIG. 1 illustrates a networked wireless communications system 100 according to an embodiment. System 100 may include one or more base stations 102, each of which are equipped with one or more antennas 104. Each of the antennas 104 may provide wireless communication for user equipment 108 in one or more cells 106. As used herein, the term "base station" refers to a wireless communications station that serves as a hub of a wireless network. For example, in a Long Term Evolution (LTE) cellular network, a base station may be an eNodeB.

The base stations 102 may provide service for macrocells, microcells, picocells, or femtocells 106. FIG. 1 shows an embodiment in which base station 102 provides wireless communication services to three cells 106. The cells may be specific to a particular Radio Access Technology (RAT) such as GSM, UMTS, LTE, etc.

Due to the directionality of some RF antennas 104, each base station 102 may serve a plurality of cells arrayed about the base station site. In a typical deployment, a base station 102 provides functionality of three to six cells 106, which are deployed in a sectorized fashion at a site. In other embodiments, one or more base station 102 may be outfitted with an omnidirectional antenna that provides service to a single cell for a given RAT. Multiple base stations 102 may be present at a site and each base station may support one or more cellular communications technologies (e.g., a base station may support UMTS and LTE cells). The one or more UE 108 may include cell phone devices, laptop computers, handheld gaming units, electronic book devices and tablet PCs, and any other type of common portable wireless computing device that may be provided with wireless communications service by a base station 102.

The system 100 may include a backhaul portion 110 that can facilitate distributed network communications between backhaul equipment 112, 114 and 116 and one or more base station 102 within a first operator network 118A. In an embodiment, the backhaul portion of the network includes intermediate links between a backbone of the network which is generally wire line, and sub networks or base stations 102 located at the periphery of the network. The network connection between any of the base stations 102 and the rest of the world may initiate with a link to the backhaul portion of a provider's communications network. The backhaul 110 may include an X2 connection through which base stations 102 communicate with one another directly.

The devices 112, 114 and 116 may be any of a plurality of network equipment such as a Radio Resource Manager (RRM), a Mobility Management Entity (MME), a serving gateway (S-GW), a Radio Network Controller (RNC), a base station controller (BSC), a mobile switching center (MSC), a Self-Organizing Network (SON) server, an Evolved Serving Mobile Location Server (eSMLC), a Home Subscriber Server (HSS) etc. Persons of skill in the art will recognize that network devices 112, 114 and 116 are different depending on the particular RAT or set of RATs that are provided in first operator network 118A.

FIG. 1 shows three different networks 118A, 118B and 118C that are controlled by different operators. In an embodiment, the different operators are independent licensors of RF spectrum, where the different operators control different portions of spectrum. For example, RF spectrum in the U.S.A. is auctioned by the FCC to various cellular providers, which operate separate and independent networks 118A, 118B and 118C. In other embodiments, a network may be controlled by some other entity such as a business or government agency.

In the embodiment of FIG. 1, the three independent networks 118A, 118B and 118C are coupled to an emergency mediation server 120. An emergency mediation server 120 may include one or more computer devices that provide services to a plurality of UEs 108. In an embodiment, UEs 108 may have program instructions stored thereon which, when executed by a processor, communicate with a remote computing device to provide emergency services to a user. The emergency mediation server 120 may include a database that stores preferences and settings for a plurality of users, including emergency contact groups, current locations of users, protocols for handling particular emergency situations, etc.

In addition, the networks 118 are coupled to an emergency dispatch center 122. An emergency dispatch center may include computer devices and personnel that receive and process requests for emergency services from users. For example, in the U.S.A., dispatch center 122 may be a 911 call center. The dispatch center 122 may receive voice and data from UE 108 directly from the networks 118. In addition, the dispatch center 122 may receive information from the emergency mediation server 120.

Figure 2:
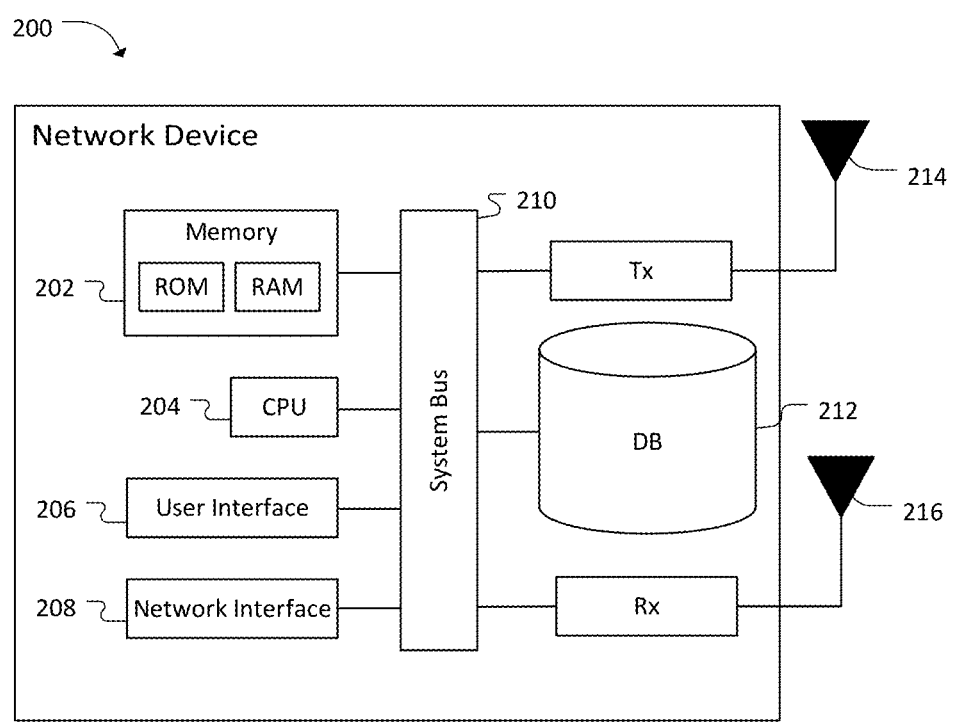
FIG. 2 illustrates a network device according to an embodiment.

FIG. 2 illustrates a block diagram of a network device 200 that may be represent UE 108, network controller devices 110, 112 and 114, an emergency mediation server 120, etc. The network device 200 has one or more processor devices including a CPU 204. The CPU 204 is responsible for executing computer programs stored on volatile (RAM) and nonvolatile (ROM) memories 202 and a storage device 212 (e.g., HDD or SSD). In some embodiments, storage device 212 may store program instructions as logic hardware such as an ASIC or FPGA. The storage device 212 and ROM of memory 202 are non-volatile computer readable media that may have computer executable instructions stored thereon which, when executed by the CPU 204, cause the network device to perform one or more operations according to embodiments of the present disclosure.

The network device 200 may also include a user interface 206 that allows a user to interact with the network device's software and hardware resources and to display the performance and operation of the system 100. In addition, the network device 200 may include a network interface 206 for communicating with external devices, and a system bus 210 that facilitates data communications between the hardware resources of the network device. If the Network device has wireless connectivity, it may have a transmitter 214 and a receiver 216, each of which may include one or more antennas that operate on one or more frequencies.

Embodiments of the present disclosure may be performed by an emergency system 130 that performs a plurality of emergency-related processes. An emergency system 130 may include one or more of the network components shown in FIG. 1, such as the emergency mediation server 120, network devices 112, 114 and 116, user equipment 108, and base station 102. In some embodiments, an emergency system 130 is based on an emergency mediation server 120 with computer-readable instructions stored thereon which, when executed by one or more processor of the mediation server, provide emergency services.

An emergency system may receive, process and route emergency requests between subscribers and the emergency dispatch center 122. In an embodiment, the emergency system 130 may transmit a request for an accurate location (e.g. latitude, longitude) to a geo-location system when not provided as part of the normal emergency call procedure (e.g. for emergency requests initiated through a mechanism other than a 911 call). The geo-location processes may be implemented by the emergency mediation server 120 or may be provided as a service through interfaces to a geolocation system, such as an eSMLC.

The emergency system 130 may maintain a subscriber register which includes subscriber profiles and details on subscribers' authorized emergency proxy groups and emergency notification groups with various levels of security. The subscriber register may be implemented as a database of emergency mediation server 120. The subscribers may be users that are subscribed to emergency services provided by the emergency system 130.

An emergency system may be implemented within existing switching systems in the cellular network, and/or as a separate hardware entity with interfaces to a cellular network. A single emergency system may interface to a single cellular network 118 or to multiple cellular networks such as networks 118A, 118B and 118C maintained by different operators.

The emergency system 130 is also capable of storing emergency requests which originate from the emergency dispatch center 122 and performing automated monitoring of the targeted subscriber to enable onward transmission of the requests immediately as conditions allow, for example when a location area update is seen for the subscriber.

The emergency system 130 may also interact with subscriber devices, e.g. UE 108, to ensure that information is only provided to the emergency dispatch center 122 if the subscriber permits this information to be shared. For example, in an embodiment, a subscriber's information is only forwarded to the emergency dispatch center 122 if the subscriber actually places a call to the emergency dispatch center 122. The subscriber's UE 108 may provide confirmation of such a call being placed in a cryptographically secure fashion. This can help prevent malicious or unauthorized retrieval of subscriber information by the emergency dispatch center 122.

In addition, the emergency system 130 may determine a set of cells that define a specific geographic (geo-fenced) area for one or more operational cellular networks 118 in the vicinity of an emergency event. The emergency system 130 may identify, track, and/or confirm the presence of all subscribers within the geo-fenced area and coordinate messaging, status updates and other activities for those subscribers.

In an embodiment, the emergency dispatch center 122 receives incoming emergency requests from subscribers as well as incoming emergency requests in the form of phone calls from family or other members of an emergency proxy group who may be concerned about a subscriber. Elements of the emergency system 130 may be located at an emergency dispatch center 122, such as a hardware device that performs one or more processes in conjunction with other elements of the emergency system to provide subscribers with emergency services.

When an emergency request is received at an emergency dispatch center 122, a determination may be made on the optimal course of action. The emergency dispatch center 122 may then request the emergency system 130 to perform the action. For example, the emergency dispatch center 122 can request the emergency system 130 to transmit communications to all members of an emergency notification group, or to user equipment within a geo-fenced area.

In an embodiment, UEs in a network have a set of program instructions stored thereon that extend functionality of the UE and interface with one or more external hardware devices to provide emergency services to the user. The emergency services may include, for example, the ability for the user to configure one or more emergency notification groups, configure one or more emergency proxy groups, and accept or reject invitations to join other users emergency notification groups or emergency proxy groups. For example, a subscriber may have one emergency notification group for medical emergencies, one for emergencies related to a car breaking down, etc.

Subscribers may be members of multiple emergency notification groups or emergency proxy groups created by other subscribers. When a subscriber adds a member to a group, the emergency application sends a message to the member, inviting him/her to join the group. The member may accept or reject the invitation. Group information may be stored in a database of an emergency mediation server 120.

In an embodiment, the UE 108 may be in communication with the emergency mediation server 120, and the emergency mediation server may communicate with the UE as well as an emergency dispatch center 122. Accordingly, the emergency mediation server 120 may facilitate communication between the UE 108 and the emergency dispatch center 122, instead of or in addition to communications directly from the UE 108 to the emergency dispatch center 122.

In an embodiment, when a subscriber makes a call to an emergency number such as 911, an emergency request may be automatically transmitted to the emergency mediation server 120, or a request may be transmitted directly to the emergency mediation server 120 from UE 108. On submission of a subscriber initiated emergency request or on reception of dispatch initiated emergency request, UE 108 may perform several processes, including silent initiation of a call in which a data connection is setup through the cellular network, and silent initiation of audio and/or video recording and retrieval of location data, e.g. GPS and Wi-Fi data from the UE.

The data connection between the UE and the emergency mediation server 120 may be used to transfer information about the subscriber including their location data, UE status (e.g. battery level), emergency request type and video/audio data stream to/from the emergency dispatch center 122. In addition, the emergency system 130 may be capable of storing a subscriber initiated emergency request when the UE is out of cellular coverage range and, and performing automated monitoring of the cellular network conditions for onward transmission of the emergency request immediately as conditions allow. In addition, the emergency system 130 may enable forced continuation of the data connection even if the normal emergency call has been terminated and the UE 108 is turned "off."

In an embodiment, a data connection is established between the emergency dispatch center 122 and the emergency mediation server 120 that provides UE data to the emergency dispatch center. For example, the UE 108 may provide one or more of location data, cell phone status data (e.g. battery level), emergency request data related to a category of emergency request, audio data and video data to the emergency mediation server 120. Such data may be processed by the emergency mediation server 120, and selectively transmitted to the emergency dispatch center 122.

Communications between the UE 108, the emergency mediation server 120 and the emergency mediation server 120 may be protected by one or more security mechanism. For example, elements of the UE that relate to emergency services may be protected by a password, in addition to or instead of biometric protection. Data related to the emergency services that is stored on the UE may be encrypted, and all emergency communications between the UE 108 and the emergency mediation server 120 and between the emergency mediation server and the emergency dispatch center 122 may be encrypted as well.

In some embodiments, the UE 108 is authenticated to the emergency mediation server 120, so that the emergency mediation server only accepts communications from authenticated hardware, thereby prohibiting unauthorized devices from communicating on behalf of a particular subscriber. The emergency mediation server 120 may authenticate all communications to and from the emergency dispatch center 122. In addition, membership in various emergency notification groups and emergency proxy groups may require verification from members before they are added to the groups.

Figure 3:
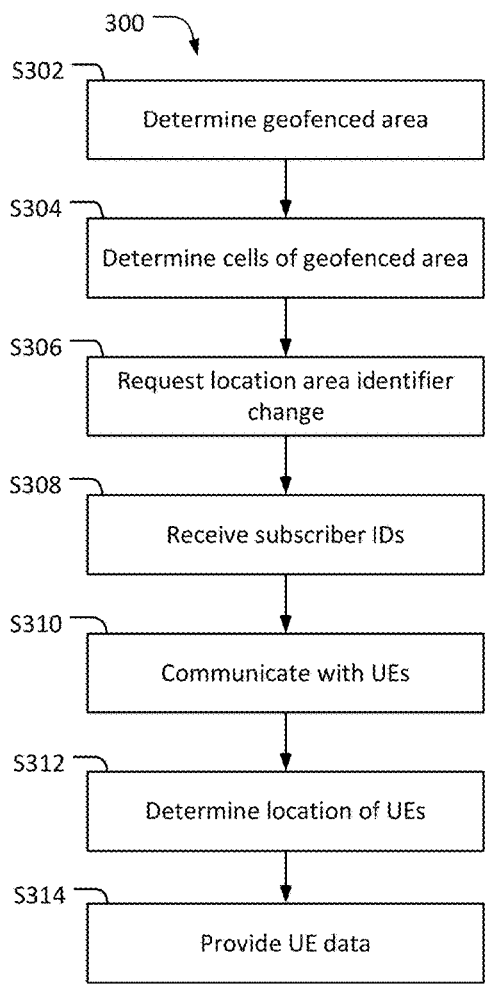
FIG. 3 illustrates a process for identifying user equipment in a network.

FIG. 3 shows a process 300 for identifying cellular devices in a region of a cellular network. The process may be initiated by a government agency or emergency service provider. For example, when an emergency such as an earthquake, terrorist attack, or hostage situation occurs in an area, law enforcement agencies and emergency service providers may wish to catalog and/or communicates with users in the vicinity of the emergency situation. Therefore, such agencies may initiate process 300 by transmitting a request to, for example, an emergency management system 130. In another embodiment, process 300 is initiated by a user providing an input into a UE indicating the presence of an emergency situation, and a location for the emergency situation.

A geofenced area is determined at S302. In one embodiment, the geofenced area is determined by an external agency such as an emergency dispatcher or law enforcement agent that has situational awareness, and provides the geofenced area to an emergency management system 130. An emergency management system may determine a geofenced area at S302 using information received from an emergency call center or other external agency. For example, an emergency call center may indicate a radius value which the emergency management system applies to location information for a UE to determine a geofenced area. In other embodiments, the emergency management system 130 determines the geofenced area without input from the external agency.

In an embodiment, the geofenced region is centered around a target cell, and the geofenced region moves with the target cell. For example, a geofenced region may be established around a UE that initiates a 911 call, and that geofenced region may move as the UE moves.

Figure 4:
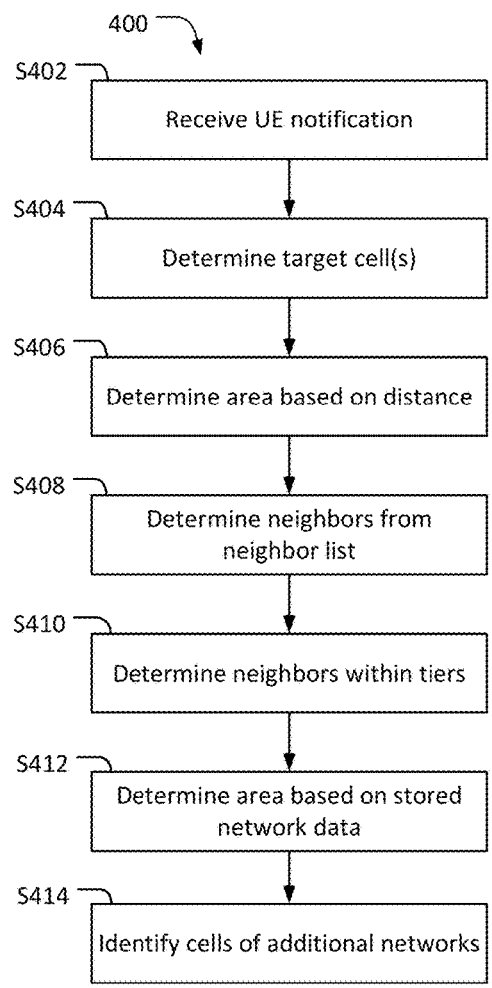
FIG. 4 illustrates a process for automatically determining neighbor cells in a network.

FIG. 4 shows an embodiment of a process 400 for automatically determining a geofenced area. Process 400 may initiate when a notification is received from a UE. The notification may be, for example, a call to an emergency service provider, such as a 911 call. In an embodiment, the UE may be programmed to transmit location information, or information that can be used to determine a location of the UE, when it is used to indicate an emergency. Thus, the notification from the UE may include one or more of the following non-exhaustive list of information: an identifier for the UE such as a Cellular Global Identifier (CGI), an identity of a cell that is providing service to the UE, GPS coordinates for the UE, network location data for the UE such as eSMLC data, and the operator of the network providing service to the UE.

A target cell is determined at S404. The target cell may be the cell providing service to a UE that initiated the process 300 by, for example, dialing 911 or otherwise requesting emergency services. In another embodiment, the target cell is determined geometrically to be the closest cell to a location of an emergency. The emergency management system 130 may determine a target cell for the UE using information received at S402.

When the UE has provided location information such as geographical coordinates, an address or a postal code, this information may be used to identify cells that provide service to that particular area. When the UE notification indicates the cellular operator that controls the network providing service to the UE, then the location information may be compared to service areas of cells that are controlled by the operator to identify a target cell.

In an embodiment, when the identity of the cell providing service to the UE is not received at S402, only macro cells are candidates for being determined as the target cell. Such an embodiment may simplify determining a target cell when a large amount of small cells are present in an area associated with the UE.

A target cell may be determined at S404 for every operator network that provides service to the area of the emergency. When a target cell is determined to be the cell providing service to a UE in a first operator network, target cells for other operator networks may be the cells that are geometrically closest to the cell providing service to the UE.

In some embodiments, more than one target cell may be determined at S404. For example, when the location data for a UE is a zip code, several macro cells of a cellular network may provide service to the zip code. In this case, each of the cells may be selected as a target cell. In an embodiment, determining target cells at S404 is accomplished by comparing location data of the UE to a lookup table or database that correlates cells with locations. One or more target cell may be identified for every operator that provides cellular services to the region of the UE.

An emergency management system 130 may maintain one or more database that may be consulted when determining one or more target cell at S404. For example, the emergency management system may maintain a database of geo-located subscriber call records. In another embodiment, the system 130 maintains a database of predicted cell coverage areas that is created, for example, through a cellular network planning or RF prediction tool.

The one or more target cell may be used to determine a geofenced area around the one or more target cell. In some embodiments, the geofenced area may be limited to the one or more target cell, where the geofenced area corresponds to coverage areas of the one or more target cell. In other embodiments, the geofenced area may be determined by examining neighbors of the one or more target cell.

The extent of the geofenced area, including whether neighbors of target cells are considered in the geofenced area, may depend on a number of factors. One factor is the nature of the situation that initiated the process 300. If the situation is a widespread emergency such as a tsunami or an earthquake that affects a relatively large area, then the geofenced area may extend beyond the service area of a target cell.

Another factor that may be considered when determining the extent of the geofenced area is the density of cells around the target cell. When the target cell is in a rural area in which each cell has a relatively large coverage area, then the motivation to consider neighbor cells is diminished. However, in a high-density region such as a metropolitan area, cell coverage areas are smaller and tend to have higher degrees of overlap, so areas with high cell density are more likely to include coverage areas of cells that neighbor cells.

Figure 5:
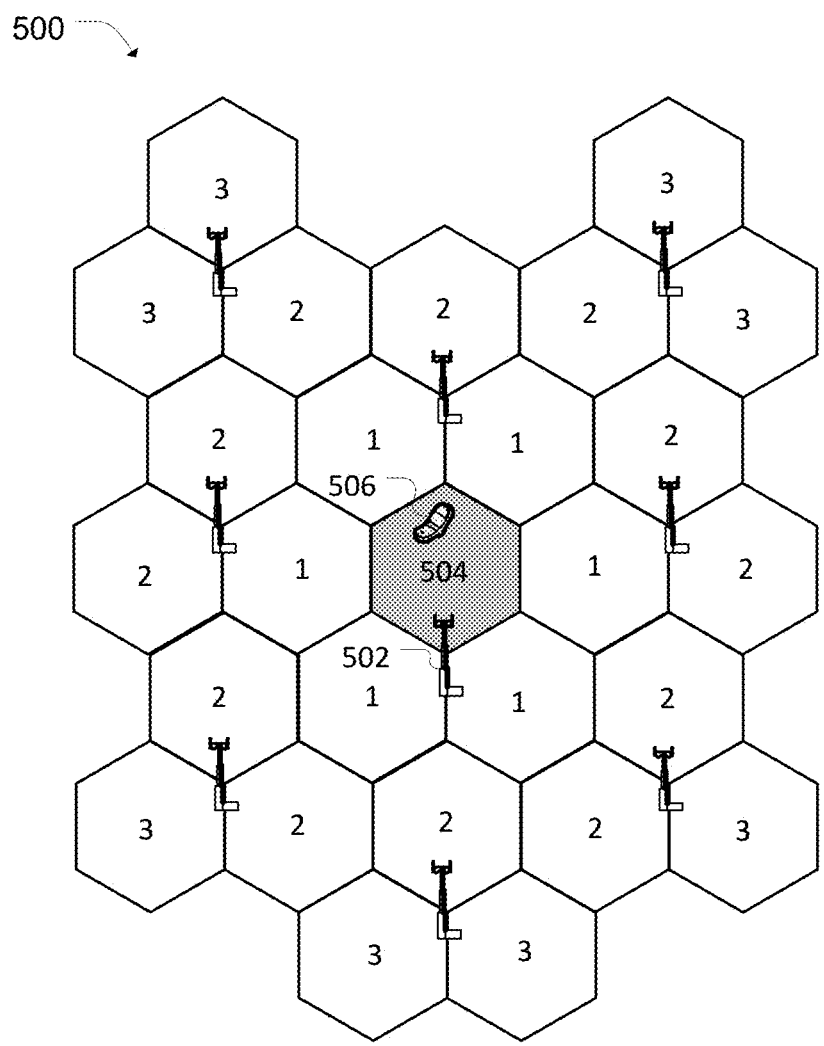
FIG. 5 illustrates an embodiment of neighboring cells in a cellular network.

Embodiments of determining geofenced areas using neighbor cell information will now be explained with respect to FIG. 5. FIG. 5 illustrates a cellular telecommunications network 500 that includes a plurality of base stations 502, each of which provides service to three cells, which are represented as hexagons. In network 500, UE 506, which may be the UE from which the notification was received at S402, is located within the coverage area of cell 504. Therefore, cell 504 is determined as the target cell at S404. In addition, FIG. 5 illustrates a plurality of base stations that provide service to cells that are intra-frequency neighbors of target cell 504.

In an embodiment, a set of neighboring cells may be identified by a geometric mechanism such as a predetermined distance from the cell 504 or a geographic location of UE 506 at S406. For example, the location of the target cell 504 may be represented by latitude and longitude coordinates of a point, such as the centroid of a cell coverage area or a location of the base station. In such an embodiment, all cells that are located within a predetermined distance of the location for target cell 504 are included in the set of neighboring base stations.

In another embodiment, a set of neighbors may be determined at S408 based on information that is used by the wireless network for mobility purposes. For example, the set of neighbors determined at S408 may be each of the neighboring cells that are present on a mobility neighbor list for the target cell 504. In particular, the set of neighbors may be the same as handover targets on the Neighbor Relations Table (NRT) of the target cell 504. This disclosure refers to these neighbors as first hop neighbors.

The set of neighbors may include neighbors of neighbors of the target cell 504 for the UE 506. The neighbors of neighbors are the handover targets on the NRTs of the first hop neighbors, which may be referred to as second hop neighbors. Similarly, the set of neighbors may include the set of cells appearing on the neighbor lists of the cells appearing on the neighbor lists of the cells on the neighbor list of the serving cell (third hop neighbors), etc. Neighbors with higher hop values may be used, for example, in a heterogeneous network (HetNet) in which small cells such as femtocells are present.

In another embodiment, the set of neighbors may be determined using the cells that are present in a Detected Set Report (DSR) for the UE.

In yet another embodiment, the set of neighboring cells includes cells that are within a configurable number of neighbor tiers of the source cell. In such an embodiment, first tier neighbor cells are cells that have a coverage area that is adjacent to or overlapping with a coverage area of a source cell. Similarly, a second tier neighbor cell is a cell that has a coverage area that is adjacent to or overlapping with a coverage area of a first tier neighbor of a source cell, and that is not a first tier neighbor of the source cell.

Neighbor tier relationships between cells may be recorded in a telecommunications system. Therefore, in an embodiment, determining a set of neighbors at S410 includes receiving neighbor tier relationship information from a cellular telecommunications system and determining the cells that are within a configurable number of tiers from the source cell. For example, when the number of tiers is configured to be three, then the set of neighbor cells includes the first tier, second tier, and third tier neighbors of the target cell 504.

FIG. 5 shows an embodiment of a target cell 504 and some of its first, second and third tier neighbors. The cells designated with a "1" have coverage areas that are adjacent to target cell 504, so they are first tier neighbors. Similarly, cells that are adjacent to the first tier neighbors are second tier neighbors marked with a "2," and cells that are adjacent to the second tier neighbors and are not first tier neighbors are third tier neighbors marked with a "3."

In an embodiment, the neighbor cells identified at one or more of S406, S408 and S410 define the geofenced area. In one example, a geofenced area is defined by first and second tier neighbors of a serving cell. In such an embodiment, the first and second tier neighbors are determined at S410, and the geofenced area of FIG. 5 is the area occupied by the cells marked "1" and "2." Similarly, the geofenced area may correspond to the area occupied by first and second hop neighbor cells determined at S408.

The geofenced area may be determined based on geographic area information stored by, for example, a database of an emergency mediation server. Examples of the geographic area information include political boundaries such as the boundaries defining cities, counties, states and nations, network boundaries such as sub-networks, tracking areas and location areas, zones such as urban and rural zones, neighborhoods, user-defined areas, etc.

Several different operator networks, or wireless service providers, typically provide cellular services to the same geographic areas. Some embodiments may identify users of all operator networks within a geofenced area. Therefore, process 400 of automatically determining a geofenced area may be performed for a plurality of cellular networks run by different operators that are active in the geographic area around the UE 506 at S414.

There are several ways in which cells of networks maintained by other operators may be determined at S414. In one embodiment, a geofenced area of the operator network 500 which provides service to UE 506 is applied to plural operator networks, and all cells within the geofenced area are identified. In another embodiment, elements of process 400 are repeated for each operator network. For example, a target cell corresponding to the target cell of the first operator network may be identified for each additional operator network at S404, and a geofenced area is determined for the additional operator networks using processes according to S408 and S410.

Returning to FIG. 3, cells of a geofenced area are determined at S304. In embodiment in which a geofenced area is transmitted from an emergency service provider or government agency at S302, determining the cells at S304 may include identifying cells that have a coverage area that overlaps with or are enclosed by the geofenced area. In other embodiments, such as an embodiment in which the geofenced area is automatically determined based on neighbor cells by process 400, the cells of the geofenced area may be the target cell and the neighbor cells identified by that process.

Cellular networks are subdivided according to location area identifiers, which are Location Areas (LAs) that are identified by Location Area Codes (LACs) in 3G networks, and Tracking Areas (TAs) that are identified by Tracking Area Codes (TACs) in 4G networks. Each location area includes a distinct group of base stations that provide service to a plurality of cells.

A request to change at least one location area identifier is made at S306. When location area identifiers are changed, the network forces all UEs in the affected areas to register with the network. In an embodiment, the request at S306 is transmitted by an emergency mediation server 120 to one or more MMEs associated with the geofenced area.

The request to change location area identifiers (e.g., TAC and LAC) may be targeted to the geofenced area. Therefore, in an embodiment, the values of location area identifiers are selectively changed for cells in the geofenced area. The location area identifier values may be changed by automated parameter update processes that alter the current local area identifier in each cell of interest. For example, the emergency mediation server 120 may transmit a message to an MME that instructs the MME to change TACs for cells in the geofenced area, thereby soliciting Tracking Area Update Request messages that include unique identifiers from attached UEs in idle mode and connected mode.

In an embodiment, the location area identifiers are changed to a temporary location area identifier value, and then changed back to the original location area identifier values. The temporary identifier may be a specific identifier that is not otherwise present in a network.

When different location area identifiers are registered, the network makes globally unique identities such as International Mobile Subscriber Identities (IMSIs) of devices (UEs) that are being served by the affected cells available to the network. Networks will make these identities available even for UEs that are in an idle mode. Therefore, the list of device IDs that is returned by the network at S308 is a more thorough list of devices that are present in the area than techniques that only discover users that are in connected mode.

The subscriber IDs returned at S308 may be temporary subscriber identities which may be linked within a cellular network to a globally unique subscriber identity for the UE. In particular, the subscriber IDs returned at S308 may be temporary subscriber identities which may be linked within a cellular network to a globally unique subscriber identity for the UE (e.g. IMSI, ESN, dynamically assigned device IP Address, etc.) The subscriber IDs may be received by an emergency mediation server 120 from each network for which a location area identifier change was requested at S306.

After the list of subscriber IDs is received, the emergency management system 130 may perform one or more subsequent processes in relation to UEs associated with the IDs on the list. In some embodiments, the list is cross-referenced with a list of devices that are present in a database of the emergency management server 120, and the one or more subsequent processes are only performed for such devices. However, in other embodiments, the one or more subsequent processes are performed for all UEs whose IDs were received at S308, or for some other portion of those UEs.

In an embodiment, the system communicates with the UEs in the geofenced area at S310. For example, when an emergency situation such as a natural disaster affects the geofenced area, the emergency management system 130 may transmit messages to UEs in the geofenced area informing users of the emergency situation. Communicating with the UEs may include requesting status information from users, such as whether the users are in need of assistance or are safe.

In another embodiment, locations of the UEs may be determined at S312. Locations may be determined by existing location based systems such as an SMLC and eSMLC, or within the emergency management system 130 based on positioning requests made to the UEs.

The locations of the UEs may be provided to external systems at S314. For example, the subscriber IDs and/or location information for the UEs may be provided to emergency responders or law enforcement agencies, which may use the UE data to determine the users that are present at the geofenced location. Emergency responders include government personnel including police, firemen and the national guard, volunteer organizations such as search and rescue teams and volunteer firefighters, and private responders including ambulances and emergency service providers.

Several specific use cases within the scope of this disclosure will now be explained. These use cases are provided to illustrate how various embodiments of this disclosure can be applied in different situations. The use cases are provided for the purpose of example to enhance the understanding of the scope of this disclosure, and are not to be construed as limiting.

In a first use case, a user calls 911 to report a robbery and hostage situation at a bank. The emergency dispatch center 122 that receives the 911 call identifies a region that is a predetermined radius of two kilometers around a location corresponding to the bank's address, and transmits that information to an emergency system 130. The emergency system establishes a geofenced region in the two kilometer radius around the bank and identifies every cell with a coverage area that overlaps with the geofenced region in every cellular network operating in the area, and transmits a request to network devices of each network to change TACs and LACs for the cells operating in the region.

All UEs in each network register to each network by providing IMSIs regardless of whether the UEs are in idle mode or connected mode, and the IMSIs are transmitted to the emergency system 130. The emergency system receives IMSIs for the UEs, and requests location data for each IMSI from the respective networks. After receiving the location data, the emergency system then correlates the location data with the geofenced area, and determines which UEs are present in the geofenced area. The identities of the UEs are then transmitted to a law enforcement agency, which uses the identities and the location data to determine the identities and locations of all persons involved in the hostage situation (victims and perpetrators) that have powered-on cellular devices, providing a level of situational awareness that would not otherwise be possible. The emergency system continues to track the locations of the users in the geofenced region, even after the users leave the geofenced region to keep track of possible accomplices.

In a second use case, a user calls 911 to report a train crash that started a fire in an urban area. In this case, the train crash may be treated differently from the ensuing fire.

For example, the 911 call center may determine a location of the train crash and transmit that information to an emergency service provider. The emergency service provider, in turn, uses the location of the train crash to establish a geofenced area in each cellular network that provides service to the crash location. Because the space occupied by a crash event is typically limited, the geofenced area for the train crash may be limited to a single macro cell of each operator network that serves the location. The emergency management system transmits a location area identifier to each operator network, and receives lists of user identities. The emergency management system then provides this list to emergency responders, which catalog the user information as a possible list of victims of the crash, and use that information to direct rescue efforts.

The fire can spread and potentially affect a larger region in the future. Therefore, the emergency call center may indicate a larger geofenced area to the emergency management system for the fire, or may indicate a location and a number of neighbor tiers around the location. The emergency management system transmits a request to operators of the larger geofenced region to change location area identifiers of associated cells. Such a request may be transmitted at the same time as the request for the train crash geofenced area. The system then identifies UEs that are present in the geofenced area that subscribe to an emergency alert service, and transmits messages that include information about the fire to each of the subscribed UEs.

In a third use case, a user's car breaks down. In this situation, a process for identifying UEs in a geofenced area may be conducted without communicating with a government agency or emergency dispatch center. Instead, the user transmits a message to an emergency mediation server by providing an input into a UE indicating the emergency situation. The emergency mediation server stores several alert groups for the particular user, one of which is designated for low risk emergencies such as the broken-down car.

The emergency mediation server receives the input from the UE and establishes a geofenced region that is four neighbor tiers from the target cell providing service to the UE. The emergency mediation server then queries a database to determine which operator networks provide service to members of the user's alert group, and transmits a request to change location identifiers to each of the networks. The emergency mediation server receives a list of UEs in the geofenced area and determines that no UEs of the alert groups are present.

The emergency mediation server then repeats the process for an expanded geofenced area of ten neighbor tiers, and determines that two UEs on the alert list are present in the expanded area. The emergency mediation server provides this information to the UE associated with the user whose car broke down, who may then contact either or both of the two UEs of the alert group that are within the geofenced region for assistance.

In a fourth use case, a mass emergency such as an earthquake or tsunami occurs. An emergency mediation server sends an alert to all users in the vicinity of the mass emergency. In such scenarios, communications infrastructure, and in particular voice circuits to emergency call centers, are often overloaded with those trying to report their status and those checking on them. An embodiment of this disclosure may alleviate the strain on call centers by forwarding an assured delivery message to a call center even when voice circuits are not available to facilitate a voice call.

In an embodiment, users can optionally respond to an emergency alert with status (e.g. "ok" or "not ok") and this status is automatically sent to all emergency contacts. Time stamp and any notes from the user are provided to the emergency contacts. Emergency respondents have access to the status so that can utilize this information to better mobilize their resources. In addition, the user, emergency contacts and emergency respondents can participate in a chat room.

Dynamic Position Tracking

Embodiments of a dynamic position tracking system and process will now be explained with respect to FIGS. 6-11. Embodiments of a dynamic position tracking system may include data privacy and record keeping of any access to private user data to ensure security of stored user data and to prevent misuse of collected user data.

Figure 6:
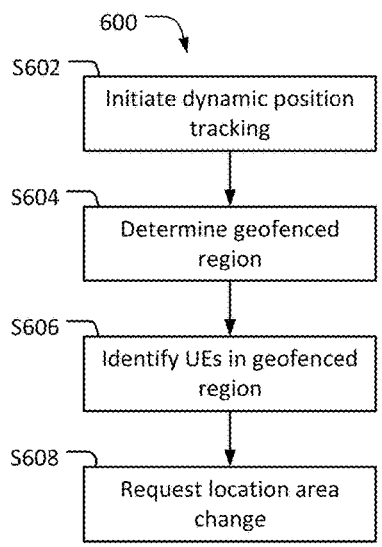
FIG. 6 illustrates a process for dynamic position tracking and identification of a UE in a cellular network environment.

FIG. 6 illustrates a process 600 for dynamic position tracking and identification of a UE in a cellular network environment. Dynamic position tracking is initiated at S602. Dynamic position tracking could be implemented by a person that wishes to discover the identity of a UE that is on the person of a moving user, which could in turn be used to identify the person that is carrying the UE. Initiating dynamic position tracking may include sending a signal to a central computing entity such as an emergency mediation server 120 that is coupled to one or more operator network 118. In such an embodiment, the emergency mediation server 120 may collect information from multiple operators.

One example scenario involves a public safety officer, e.g. a police officer, that is following a suspect in a moving vehicle. In this case there is a high likelihood that the vehicle being followed contains one or more operational wireless mobile device, or UE, which the public safety officer wishes to identify by suitable mobile network identifiers. Mobile network identifiers that can be discovered by embodiments of this disclosure include an Electronic Serial Number (ESN), International Mobile Equipment Identity (IMEI), International Mobile Subscriber Identity (IMSI), a mobile IP address, phone number, etc.

A geofenced area is determined at S604, which may be a dynamic geofence. A dynamic geofence may be a geographic region defined relative to the public safety officer's current position, such that the dynamic geofence moves when the officer moves. In an embodiment, the dynamic geofence can be as simple as current geographic coordinates with a defined geofence radius. In other embodiments, the dynamic geofence may include more sophisticated implementations such as irregular geofence areas defined relative to local streets or other geometric areas of interest.

Figure 7:
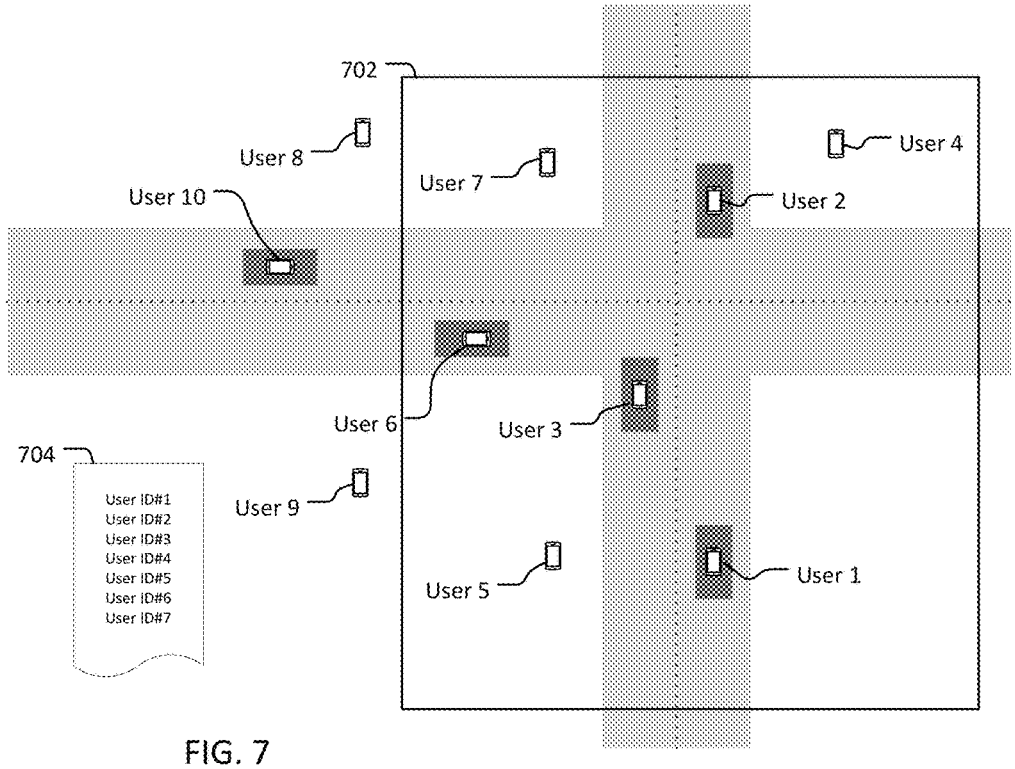
FIG. 7 illustrates an embodiment of performing dynamic position tracking.

FIG. 7 illustrates an embodiment in which a geofence 702 is established around User 1, who is a public safety officer that initiated a dynamic position tracking process 600. Here, User 1 is an anchor point for the geofenced region 702.

An initial anchor point for the dynamically defined geofence 702 may be manually entered based on a known current location such as a street intersection or other fixed geographic landmark, or may be automatically determined based on GPS coordinates from a positioning system external to the wireless network, positioning information associated with a mobile device operated by the public safety officer, etc. Examples of such information includes GPS-based positioning information for the public safety officer, positioning information determined by the wireless network based on signals transmitted by, or received by the public safety officer's mobile device, etc. In an embodiment in which multiple user captures are performed based on a geofenced region, the anchor point may move over time based on the movements of the initiating user.

FIG. 7 illustrates the initial detection of users within the dynamically defined geofenced region 702. In this illustration, a user such as a public safety officer initiates the dynamic geofence detection process. The current location of this initiating user may be provided via manual entry of coordinate locations such as latitude, longitude, street intersections, addresses, etc., or via automated positioning methods based on the current location of the initiating user's mobile device or vehicle, e.g. GPS positioning, wireless network user location services, etc.

In addition, an anchor point, which may be a dynamic location such as the location of User 1 in FIG. 7, can be used to orient the geofenced region 702 as it moves through space. For example, as seen in FIG. 7, the geofenced region 702 is oriented to have more area in the direction of travel of User 1, which is upwards. Because the officer is moving upwards towards User 2, the geofenced region 702 is larger in front of the officer than it is behind the officer. However, a geofence that is offset according to the direction of travel of a mobile device of an initiating user is merely an example of one dynamic geofence embodiment. In other embodiments, geofences may be symmetrically oriented about the user, and may have a variety of shapes and sizes.

UEs that are located within the geofenced region 702 are identified at S606. As seen in FIG. 7, all currently active wireless system users that are active within the defined geofenced region 702 are recorded on a list 704 based on unique mobile device identifiers, which may be referred to as a proximity list. Identifying the UEs within the geofenced region 702 at S606 may include determining coordinates for UEs through cellular network data and comparing the determined coordinates of the UEs to the geofenced region 702. Additional information for the UEs may be collected for one or more of the UEs within the geofenced region 702 at S606 such as location data, metrics, Key Performance Indicator (KPI) values, etc.

Process S606 of identifying UEs in geofenced region 702 is relatively straightforward for mobile users engaged in active voice or data sessions based on available mobile message traces such as Positioning Calculation Application Part (PCAP) mobile positioning messages. However, detection of idle mode devices, that is devices that are camping on cells and not currently engaged in active voice or data transfer sessions, may require additional processes, such as requesting a location area change at S608.

When UEs are in idle mode, the cellular network to which the UEs are registered may have limited awareness of the current location and status of the idle mode UEs. Therefore, embodiments of the present application may identify idle mode UEs by requesting a location area change at S608.

In an embodiment, UEs can be forced to send location area update messaging, e.g. LAC/TAC updates, at S608 by temporarily altering the Location Area or Tracking Area codes associated with wireless cells serving the defined geofenced region 702 at S608. Embodiments of the present disclosure support temporary reassignment of LAC/TAC configuration to network cells via automated Self Organizing Network (SON) processes such that new, temporary LAC/TAC codes are broadcast by cells serving the geofenced region 702. Per existing mobile device protocols, each mobile device in idle or active mode that detects a new LAC/TAC area must respond with LAC/TAC update messaging to re-register to the newly changed tracking area. In an embodiment, the data associated with this messaging is used to identify mobile devices within the defined geofenced region 702 via associated meta-data such as UE_Context messages that identify unique user devices. LAC/TAC resets are explained in further detail above with respect to FIG. 4.

In an embodiment, a result of processes S606 and S608 is an initial list 704 of all operational UEs, whether in idle or active mode, within the defined geofenced region 702. For example, as seen in FIG. 7, list 704 includes user IDs for users 1 to 7 within geofenced region 702. However, users 8, 9 and 10, which are outside the geofenced region 702, are not present on list 704.

Embodiments are not limited to a single wireless network-elements of process 600 may be performed for multiple wireless networks via appropriate inter-networking and cooperative agreements between wireless providers. For instance, a public safety officer operating on wireless network A may initiate this sequence. All UEs operational in idle or active session mode on network A, e.g. 118A, may be identified, and requests to the network operations center of networks B and C, e.g. 118B and 118C, will also return lists of users within the defined geofenced boundaries operational on networks B and C respectively. Embodiments are scalable to multiple networks and multiple wireless network technologies such as 2G, 3G, and 4G, etc.

In addition to the current location of the initiating user, information regarding the extent and relative position of the geofenced region 702 may be defined or is stored as defaults within the server 120. For instance, the geofenced region 702 may be a circle with a predetermined radius centered on the initiating user's current position, a polygon, or other constrained area, with the initiating user's position defined relative to the shape boundary. This geofenced region extent may be stored as system defaults or entered at the time process 600 is initiated at S602.

The result of S606 may be a machine and or human readable list 704 of currently operational wireless devices within the defined geofenced region 702. The devices may currently be in either active or idle modes. The list 704 will typically include numerous devices that are not pertinent to the public safety officer initiating the search, such as users in other vehicles within the region or pedestrians on nearby sidewalks or within nearby buildings.

The initial list 704 and the process steps used to create this initial list can be described as 'proximity user capture,' or the determination of users within a defined proximity to the user initiating the process or a defined set of geographic coordinates. Subsequent processes are used to refine the initial list 704 to determine with high probability which wireless device IDs are of interest to the initiating user.

Initial detection of users within a dynamically defined geofenced region 702 establishes a superset of potential network users currently within the vicinity of the user that initiated the tracking procedure. However, while it may be possible to identify the user of interest based on an initial list 704 alone, especially when paired with accurate location data for the users, additional processes may be performed to increase the probability of determining the identity of the UE of interest. In a situation in which the initiating user is following a vehicle or person that has the UE of interest, proximity to the initiating user over time can be used to improve the accuracy of determining the identity of the UE of interest. In various embodiments, this may include comparing data between a plurality of captures within a geofenced region 702, and/or by correlating handover data.

Figure 8:
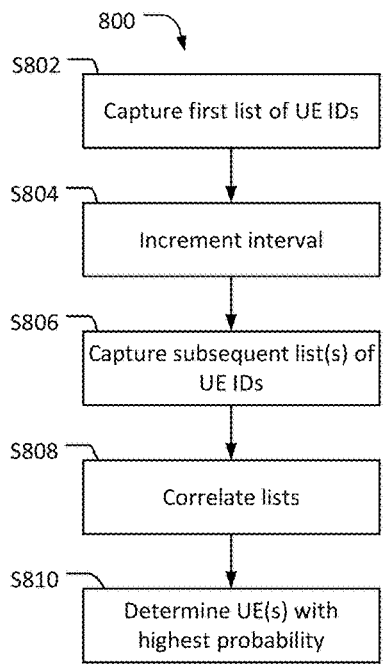
FIG. 8 illustrates an embodiment of collecting and filtering UE data in association with dynamic position tracking.

FIG. 8 illustrates an embodiment of a process 800 of collecting and filtering UE data in association with dynamic position tracking. Embodiments of FIG. 8 will now be explained with respect to FIGS. 9A, 9B and 9C.

Figure 9A:
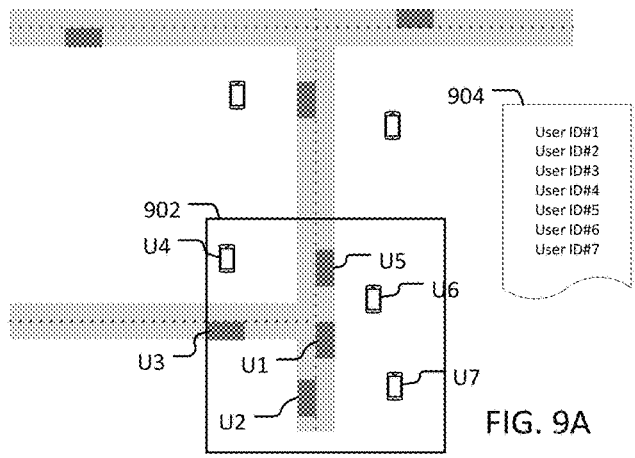
FIGS. 9A, 9B and 9C illustrate embodiments of performing dynamic position tracking.

A first list of UEs is captured at S802, which corresponds to identifying the UEs at S606 as explained above with respect to process 600. Accordingly, as illustrated in FIG. 9A, a list 904 of identities of UEs within geofenced region 902 is created at S606. In FIG. 9A, the initiating user is labeled as U1, and the initiating user is following a vehicle that includes a UE that is labeled U5.

Although not illustrated in FIG. 9A, additional information for the UEs may be collected for one or more of the UEs within the geofenced region 902, such as location data, metrics, KPI values, etc. This information may be used in conjunction with the identities of UEs within the geographical region to increase the probability of identifying one or more UE on the list as being a UE of interest, which in the scenario of FIG. 9A is a UE within a vehicle followed by the initiating user.

An interval between user captures may be incremented at S804. In an embodiment, the interval may be a predetermined time interval, such as 5 seconds, 10 seconds, or one minute. In other embodiments, the interval may be based on another unit of measure, such as distance traveled, or a network activity, such as a handover. In some embodiments, the interval is a combination of time and other factors, such as distance and time.

Figure 9B:
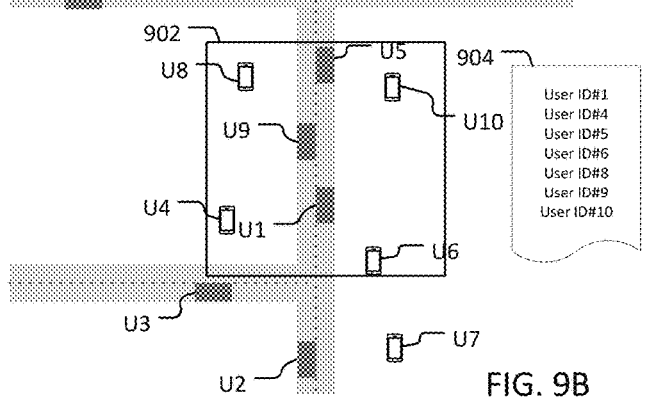
Figure 9C:
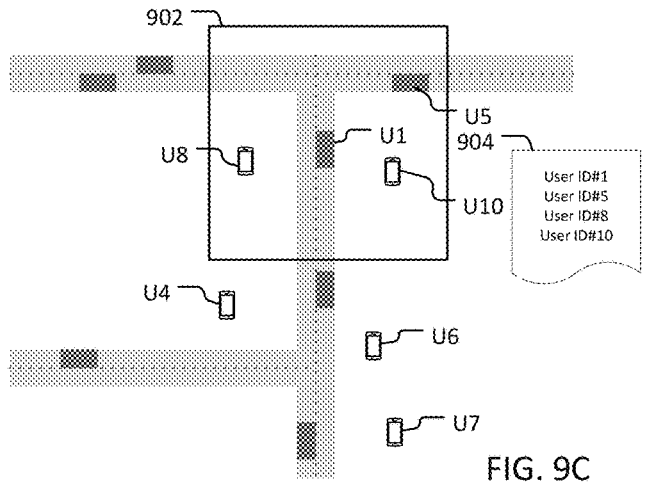

Subsequent user captures are performed at S806 after each interval of S804 passes. Subsequent user captures are illustrated in FIGS. 9B and 9C, which show a progression in time from the initial user capture illustrated by FIG. 9A. Therefore, as seen in FIG. 9B, the identities of UEs for the second user capture are different from the identities of the first user capture. In particular, UEs 2-3 and 7 are no longer within the geofenced region 904, while UEs 9 and 10, which were not within the geofenced region 902 in FIG. 9A, are now within the geofenced region, so they are present on the second list. In an embodiment, a location area code such as a TAC and LAC is reset for each user capture, or for some portion of the user captures, to identify UEs in idle mode.

FIG. 9C shows a user capture at third time point after the user capture of FIG. 9B. The third list 904 of FIG. 9C includes UE 1, which is the initiating or searching user, UE 5, which is the target, as well as UEs 8 and 80, both of which were in the previous user capture of FIG. 9B.

Data from the user captures performed at S802 to S806 is correlated at S808 to discover the identities of users that remain in close proximity to the moving initiating user. The correlation may be performed differently in various embodiments. In one embodiment, S808 includes a tally process in which each time a specific UE appears on a list 904, a value associated with the specific UE is incremented by one.

After performing a plurality of user captures, one or more UEs that have high probably of being the target UE are determined at S810. In an embodiment in which tally counts are used, identifying the highest probability UEs is performed by identifying one or more UE with high tally values across multiple list captures. In the case of law enforcement operations, even though such a process may yield a plurality of UE IDs, the plurality of UE IDs may be sufficient to permit law enforcement officers to identify an ID of the target UE through subsequent investigations.

In general, increasing the number of successive geofence location list captures increases the probability of correctly identifying the target UE. However, simply increasing the frequency of user captures by using a short time increment at S804 may have a marginal effect past a certain amount—for example, performing multiple user captures per second is unlikely to improve results. However, the accuracy of results is likely to be improved as the distances over which the searching user travels increases. Accordingly, accuracy may increase from a higher number of user captures over larger distances and longer times.

Additional factors beyond an interval tally may be considered at S810. For example, in an embodiment, one or more of distance information, handover information, serving cell information, measurement data, performance metrics, etc. is used to determine the probability of one or more of the UEs being the target UE. Such additional information may be compared to information for the searching user, wherein higher correlations result in higher probability values. In an embodiment, a probability score may be calculated for each UE that appears on some or all of the user captures based at least in part on a tally value that is weighted according to the additional information.

During normal mobile wireless operations, UEs associate with one or more base stations at any given time based on current channel conditions. As UEs move throughout a network, they handover to other network base stations such that they receive the best possible service available throughout the network.

The process of handing over from one base station to another is based on control channel messaging between each mobile device and the network base stations of interest. This handover messaging can be collected and analyzed via call trace tools to determine which UEs have performed handovers to and from network serving cells.

Figure 10:
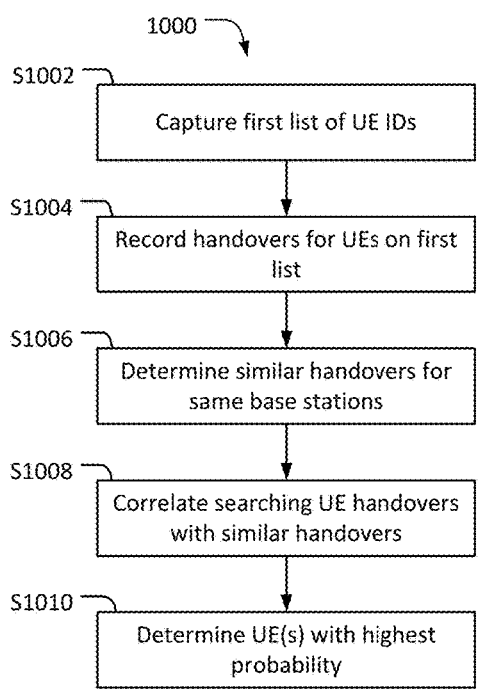
FIG. 10 illustrates an embodiment of filtering UE data collected in association with dynamic position tracking.

FIG. 10 shows an embodiment of a process 1000 for dynamic position tracking that uses wireless network handover signaling correlated between the initiating user's wireless device and the behaviors of other wireless devices listed on the initial capture list.

Figure 11A:
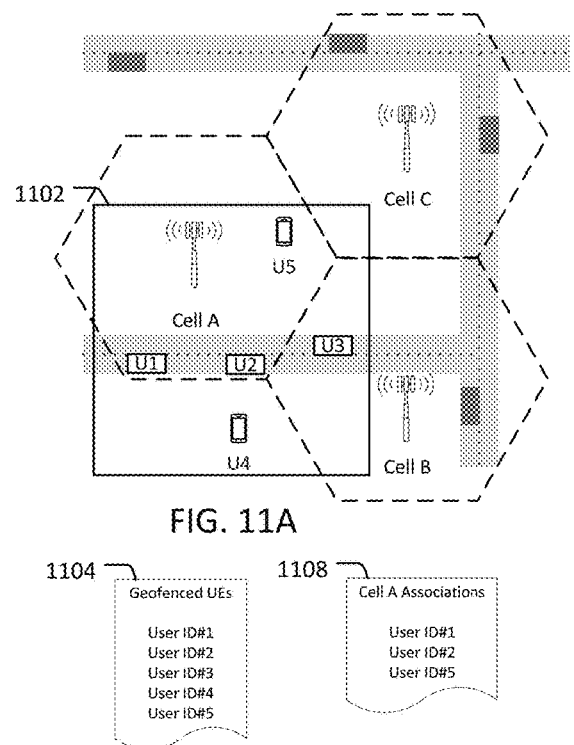
FIGS. 11A and 11B illustrate embodiments of performing dynamic position tracking.

Process 1000 may be implemented by a searching user such as a law enforcement officer. As seen in FIG. 11A, when process 1000 is initiated, an initial proximity list 1104 of users within a geofenced region 1102 around searching user U1 is created at S1002. Subsequent handovers for the users recorded on list 1104 are tracked over time. For example, as seen in FIG. 11B, handover tracking lists 1106 are created for each of users 1 to 5 that were within geofenced region 1102 when the process was initiated.

In some embodiments, handover data is collected based on handover events for the searching user at S1006. For example, handover events that are similar in time and space to the handover events for the searching user may be collected and analyzed for correlations between the searching user and other UEs. This information may be useful when location data is unavailable, when an initial geofenced proximity list 1104 is unavailable or compromised, and to discover UEs that may be engaged in a security situation that were not present in an initial geofenced proximity list 1104.

Under a handover-based approach to filtering the initial proximity users list 1102, the handover history 1106 of the initiating user's UE, which is UE1 in FIG. 11A, as well as the handover histories 1106 of each user device detected during the initial geofence capture 1104, are compared over time at S1008 to determine which of the initially detected devices are following a handover sequence with high correlation to the initiating user's handover sequence.

Figure 11B:
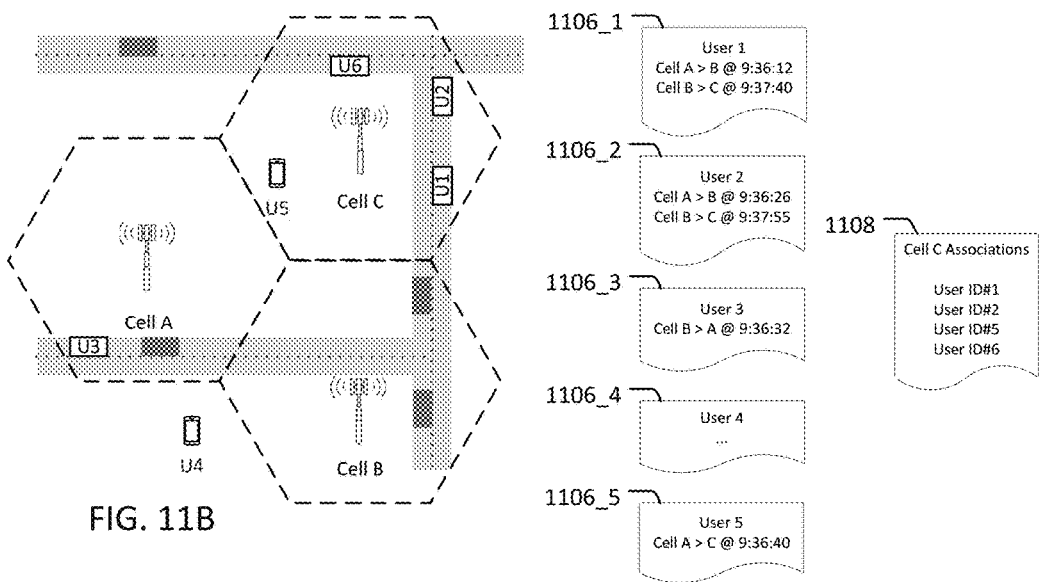

FIG. 11B shows a simplified situation in which initiating User 1 is following User 2 using dynamic tracking process 1000. Handover histories 1106 are present for each UE identified within the geofence 1102 at S1002. The handover history information includes the identities of destination and target cells and a time for each handover event that occurs after a dynamic tracking process is initiated until the dynamic tracking process is terminated. From the simplified data in FIG. 11B, it is easy to determine that User 1's handover history 1006 correlates more closely to User 2's handover history than to the handover histories of the other tracked users. Accordingly, User 2 is determined to have the highest probability of being the target UE at S1010.

As with all embodiments of dynamic position tracking, process 1000 may include changing an area code, e.g. a LAC or TAC, to gather data from idle mode users. The area code may be changed when the initial UE list is created at S1002, and area code changes may be performed periodically thereafter. In some embodiments, area code changes may be prompted by events such as a handover of the searching user, travel of a predetermined distance, passage of a predetermined time interval, manual entry, etc. As a result, embodiments may create an effective handover history for idle cell UEs as well as the normal handover history expected from active mode UEs.

In an embodiment, the searching user may have equipment that facilitates simultaneous handover tracking across networks controlled by multiple operators. For example, the searching user may have a mobile device that is registered to multiple operator networks, so that it collects data from multiple wireless networks that overlap in geographic area and are run by different operators, e.g. networks 118A-C.

In some embodiments, handover data is collected for a plurality of geographically overlapping operator networks regardless of whether the searching user is registered to more than one of the networks. In such an embodiment, the identities of UEs that are registered to multiple operator networks and are within geofenced area 1102 are recorded on a list 1104 at S1002, and handover events are recorded for the UEs in the respective operator networks. In such an embodiment, correlating handovers at S1008 may employ more sophisticated techniques than correlating within a single network. For example, because the location of cells is generally different between different operator networks, the differences in geography may be accounted for when performing the correlation at S1008.

In an embodiment, cell association data is collected and can be used in place of, or in addition to, handover data and location data to implement dynamic position tracking. For example, when UE location data is not available, cell association data can be used to establish locations of specific UEs to within the coverage areas of the associated cells. As more data is collected over longer times and distances, the cell association data becomes more accurate with respect to identifying a target UE.

When cell association data is used in a dynamic position tracking process, lists of UEs that are associated with one or more specific cell are created at various time points. FIG. 11A shows an example of a cell association list 1108 that includes identities of all UEs that are associated with Cell A when the list was created. In embodiments, cell association lists 1108 may be created at periodic time intervals, on occurrence of a network event such as a handover of the searching UE, based on manual input, etc. An area code may be reset before one or more of the cell association user captures. In an embodiment, cell association data is collected for the cell with which the searching UE is associated along with one or more cells in a geographic area close to the currently associated cell.

Cell association data and handover data are influenced by radio frequency propagation conditions. Due to radio frequency propagation uncertainty and distance and or speed differences between an initiating user's vehicle and tracked vehicles, accuracy of such processes improves with longer time frames across longer distances.

Figure 12:
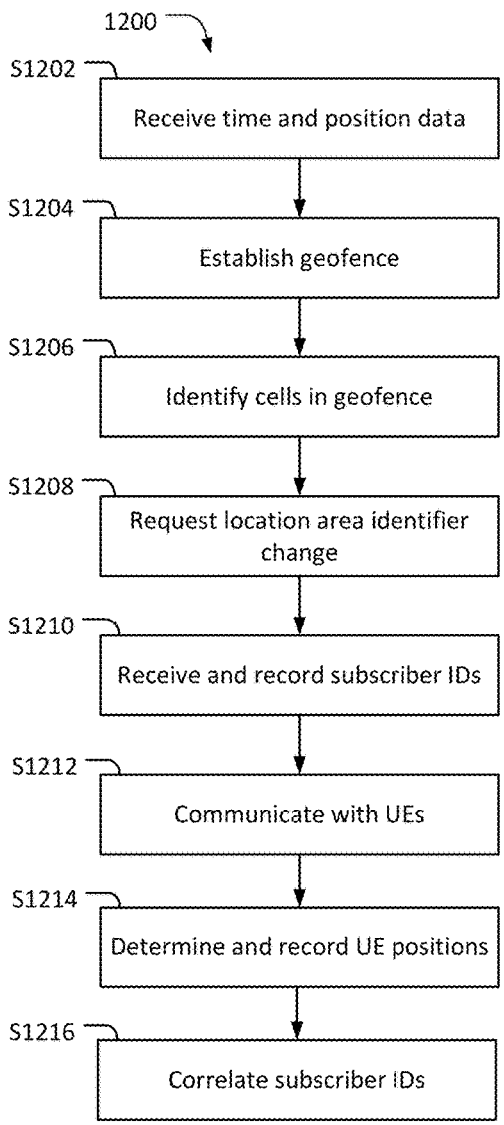
FIG. 12 illustrates an embodiment of position tracking using time and position anchors and location area dithering.

FIG. 12 illustrates an embodiment of a process 1200 for position tracking based on a set of time and position values. While some of the embodiments discussed above are performed with respect to the location of a particular UE, and the position of the UE can change over time, embodiments of process 1200 can use a set of time and position values that are not necessarily tied to the position of a UE.

Position and time data is received by an entity that performs position tracking, such as an emergency system 130, at S1202. The position and time data may be manually input into the system, or automatically obtained from an external source. The position data may be latitude and longitude coordinates, and it may be time-stamped GPS data.

In some embodiments, the position data is based on an event such as a route taken by a person, vehicle, or group of vehicles. Other examples of an event are a parade or procession that moves over time, or more generally, a known or hypothesized route of one or more persons. Each of the position and time values may be an anchor, or basis, for identifying one or more user. The position and time data may correspond to the path of an a natural disaster or some other event.

A geofenced area may be established at S1204 based on the time and position data. In an embodiment, the geofence is used to identify one or more cells that provided service at the position and time indicated in the position data received at S1202. Accordingly, the geofenced area may be an area of sufficient size and shape to identify one or more cell that provides cellular service to UEs at or nearby each position and time received at S1202. For example, the geofenced area may be a circle with a center at the location of the position received at S1202 that has a diameter of 0.5 kilometers or 1 kilometer.

However, embodiments are not limited to this example. In other embodiments, the specific size and shape of the geofenced area established at S1204 may differ. For example, a larger geofenced area may be established in a lower population density area, while a smaller geofenced area may be established in a higher population density area. In general, the size of a geofenced area should be sufficient to identify cells providing service to users near the position of the position data.

Cells within the geofenced area are identified at S1206. Identifying cells within the geofenced area may include identifying every cell whose coverage area overlaps with the geofenced area. The coverage area may be defined, for example, by the area in which base station transmissions are attenuated by an appropriate path loss target (e.g. 120 dB of mean path loss to cell edge). In other embodiments, a cell may be identified as being within the geofenced area based on a centroid of the coverage area, a pointing direction of an antenna, or techniques known in the art. In an embodiment, when a cell is identified as being within the geofenced area, one or more of its neighbor cells may be included in subsequent elements of process 1200.

A location area identifier change is requested at S1208. S1208 may be performed in the same manner as S306 discussed above, e.g. by dithering a TAC or LAC for every cell within the geofenced area. The location code may be dithered at one or more cell that was identified at S1206 at the time received at S1202. In an embodiment in which the entity performing process 1200 controls a cell within the geofenced area, S1208 may include requesting the base station providing service to the cell to change the associated LAC or TAC.

Other elements of process 1200 may be performed in a similar fashion to corresponding elements of process 300 described above. For example, subscriber identities may be received at S1210 and stored in a memory as described above with respect to S308, UE communication at S1212 may be performed in a similar fashion to S310, UE positions may be determined and recorded at S1214 in a similar fashion to S312, and subscriber IDs may be correlated at S1216 in a similar fashion to S314. Elements of process 1200 may be performed for each location and time data received at S1202.

The subscriber IDs correlated at S1216 may include all subscriber IDs associated with each cell identified at S1206. Therefore, active cell association data may be used in conjunction with the IDs of cells in idle mode to identify one or more subscriber ID that is present for each time and position received at S1202.

One distinction between process 1200 and process 300 is that in process 300, anchor points for identifying nearby user IDs are anchored to an object or person, while in process 1200, the anchor points may be predetermined locations.

Figure 13:
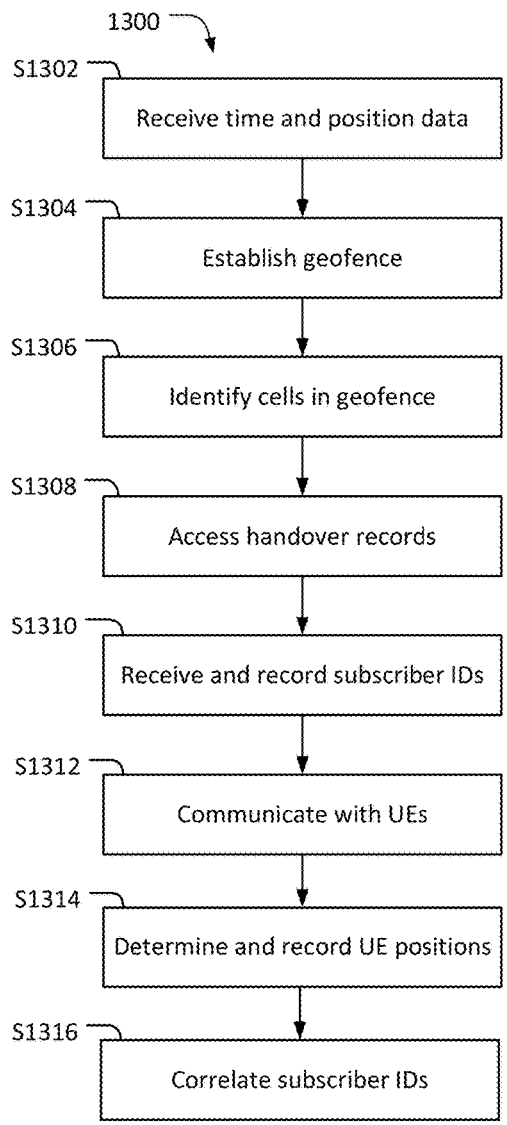
FIG. 13 illustrates an embodiment of position tracking using time and position anchors and handover records.

FIG. 13 illustrates a process 1300 for tracking UE positions. Some elements of process 1300 are similar to elements of process 1200. For example, time and position data may be received at S1302 in a similar fashion to S1202, where the time and position data may be input by a user. The time and position data received at S1302 may be used to establish anchor points for establishing geofence at S1304. One or more cell within the geofence is identified at S1306 in a similar fashion to S1206.

Cellular providers store handover records in a system memory, including handover times, source and target cells, and UE identities. Handover records for cells identified at S1306 are accessed at S1308. The handovers that are accessed at S1308 may include hard and soft handovers.

Accessing handover records at S1308 may include transmitting a request to a cellular provider to provide records of all handover events recorded for the cells identified at S1306 that are within a predetermined window with respect to the time data received at S1302. The time window may be a value such as 1 minute, 5 minutes, 30 minutes, or one hour, before and after each time point received at S1302. In some embodiments, multiple time windows may be applied to narrow or expand the scope of the process depending on results from a correlation.

Although various aspects of dynamic position tracking have been explained separately with respect to various figures and process numbers, the discussion of discreet elements is provided to enhance the clarity of description. Embodiments of the present disclosure may use multiple elements of the processes explained above in different combinations. For example, one embodiment may determine UE identities based entirely on geofence user captures, while another embodiment may rely on cell association and handover data without using geographical coordinates for UEs, and another embodiment may use all three data types. In other embodiments, position tracking may be performed both in real-time and retrospectively. For example, position tracking may be performed a first time using a UE's current location as an anchor point, and performed a second time using manually input anchor points and handover data.

Some embodiments may use mobile device distance estimating technology such as metrics related to radio frequency signal time of flight. For instance, when correlating movement across multiple base stations via sequential handovers, a metric representing distance between candidate mobile devices and serving base stations may be used to further identify which mobile devices have a high probability of being located within the tracked vehicle.

Each of the processes described above may be enhanced by incorporating what is often termed as RF fingerprinting technologies, whereby signal strength variations reported by standard cellular metrics are compared to predicted radio frequency propagation to estimate user positions. In embodiments of RF fingerprinting, the radio frequency fingerprinting information may be correlated between the initiating user's mobile device and the candidate mobile devices to further isolate mobile devices which have a high probability of being located within a tracked vehicle. For instance, when both the initiating user's mobile device and a tracked vehicle's mobile device enter a narrow canyon or drive over a hilltop, the radio frequency propagation fingerprinting information for the respective UEs will be highly correlated to one another. On the other hand, other mobile devices in the same general vicinity but moving along different paths will tend to show very different RF fingerprints not strongly correlated to the initiating user's device. Statistics related to these radio frequency channel measurements may be used to enhance the accuracy of dynamic position tracking processes.

Embodiments of the present disclosure provide several improvements to emergency services. For example, embodiments of the present disclosure may provide a set of UE identities for UEs that are affected by an emergency situation in an efficient manner. While other techniques are limited to connected devices in a single network, identities provided by an embodiment of this disclosure include identities of UEs in idle mode and across a plurality of operator networks. In addition, embodiments of the present disclosure facilitate discovery of, communication with, and tracking of UEs in idle mode, which is not possible with conventional technologies.

Embodiments of a dynamic position tracking system provide improvements to tracking technology. For example, conventional tracking technology tends to rely on visual or optical data. Conventional systems use humans to monitor multiple sources of visual information, which may include human operated vehicles such as a helicopter. Embodiments of dynamic position tracking systems according to the present disclosure may be highly automated, such that a single person can initiate processes that use network information to obtain the identity of a moving UE. Other systems, such as facial recognition and computer vision tracking systems, generally require sophisticated visual data collection systems (e.g., closed circuit camera systems) to collect visual data for analysis. In addition, such systems can be thwarted by relatively simple techniques, such as covering a face to thwart facial recognition, or covering a license plate to thwart a license plate reader.

Embodiments of the present disclosure facilitate operations that are not possible using conventional technology. When large-scale disasters occur, identifying persons affected by the disaster can take days or weeks. In extreme cases, bodies of some victims are never recovered. Embodiments of the present application facilitate location tracking that can be conducted while a disaster is unfolding, as well as retrospectively, to identify locations of UE belonging to missing persons. This location data can be provided to family members, members of an emergency response group, or emergency personnel to aid in search and rescue efforts.

Another field that is improved by embodiments of the present disclosure is security technology. For example, when a public figure moves along a route, it is possible to use embodiments of the present disclosure to identify persons along that route through associated user identities. In cases where a route of a perpetrator is known, embodiments of this disclosure can be used to determine whether victims or associates are nearby and to help locate the perpetrator.

What is claimed is:

1. A method for identifying a target user equipment (UE) in a cellular telecommunications network, the method comprising:
   receiving a plurality of time and position coordinate pairs including first and second coordinate pairs;
   establishing a plurality of geofences, each geofence of the plurality of geofences corresponding to one time and position coordinate pair of the plurality of time and position pairs;
   for each geofence, determining at least one cell that provides service to the geofenced area;
   for the at least one cell of each geofence, determining a set of UE identities associated with the at least one cell at the time of the one time and position coordinate pair that corresponds to the respective geofence; and
   correlating all sets of UE identifiers for the plurality of coordinate pairs to determine at least one UE identifier that occurs at a highest frequency for all of the coordinate pairs.

2. The method of claim 1, further comprising:
   transmitting a request to change a location area identifier value to a base station of the at least one cell; and
   receiving an identity of at least one UE in idle mode when the location area identifier is changed,
   wherein the received identity of the at least one UE is in the set of UE identities.

3. The method of claim 2, wherein the location area identifier is a Location Area Code (LAC) or a Tracking Area Code (TAC).

4. The method of claim 3, wherein the request to change the location area identifier is transmitted at the time of the first coordinate pair.

5. The method of claim 2, further comprising:
   accessing handover records for the at least one cell of each geofence,
   wherein the set of UE identities includes an identity of at least one UE that was handed over to or from the at least one cell.

6. The method of claim 1, further comprising:
   accessing handover records for the at least one cell of each geofence,
   wherein the set of UE identities includes an identity of at least one UE that was handed over to or from the at least one cell.

7. The method of claim 6, wherein the handover records are records for handovers to and from the at least one cell within a predetermined time period from the time of an associated time and position coordinate pair.

8. The method of claim 1, wherein the time and position coordinate pairs are provided by an emergency responder.

9. The method of claim 7, wherein the time and position coordinate pairs correspond to times and positions of the emergency responder.

10. An emergency management system coupled to a cellular telecommunications network, the system comprising:
    a memory;
    a processor;
    and at least one non-transitory computer readable medium with executable instructions stored thereon which, when executed by the processor, perform the following operations:

receiving a plurality of time and position coordinate pairs including first and second coordinate pairs;

establishing a plurality of geofences, each geofence of the plurality of geofences corresponding to one time and position coordinate pair of the plurality of time and position pairs;

for each geofence, determining at least one cell that provides service to the geofenced area;

for the at least one cell of each geofence, determining a set of UE identities associated with the at least one cell at the time of the one time and position coordinate pair that corresponds to the respective geofence; and correlating all sets of UE identifiers for the plurality of coordinate pairs to determine at least one UE identifier that occurs at a highest frequency for all of the coordinate pairs.

11. The emergency management system of claim 10, wherein the operations further comprise:

transmitting a request to change a location area identifier value to a base station of the at least one cell; and receiving an identity of at least one UE in idle mode when the location area identifier is changed, wherein the received identity of the at least one UE is in the set of UE identities.

12. The method of claim 11, wherein the location area identifier is a Location Area Code (LAC) or a Tracking Area Code (TAC).

13. The method of claim 12, wherein the request to change the location area identifier is transmitted at the time of the first coordinate pair.

14. The method of claim 11, further comprising:

accessing handover records for the at least one cell of each geofence, wherein the set of UE identities includes an identity of at least one UE that was handed over to or from the at least one cell.

15. The method of claim 10, further comprising:

accessing handover records for the at least one cell of each geofence, wherein the set of UE identities includes an identity of at least one UE that was handed over to or from the at least one cell.

16. The method of claim 15, wherein the handover records are records for handovers to and from the at least one cell within a predetermined time period from the time of an associated time and position coordinate pair.

17. The method of claim 1, wherein the time and position coordinate pairs are provided by an emergency responder.

18. The method of claim 16, wherein the time and position coordinate pairs correspond to times and positions of the emergency responder.

19. A method for identifying a target user equipment (UE) in a cellular telecommunications network, the method comprising:

receiving a plurality of time and position coordinate pairs including first and second coordinate pairs;

establishing a plurality of geofences, each geofence of the plurality of geofences corresponding to one time and position coordinate pair of the plurality of time and position pairs;

for each geofence, determining at least one cell that provides service to the geofenced area; and for the at least one cell of each geofence, determining a set of UE identities associated with the at least one cell at the time of the one time and position coordinate pair that corresponds to the respective geofence by:

accessing cell association records for the at least one cell of each geofence;

accessing handover records for the at least one cell of each geofence, transmitting a request to change a location area identifier value to a base station of the at least one cell; and receiving an identity of at least one UE in idle mode when the location area identifier is changed, and correlating all sets of UE identifiers for the plurality of coordinate pairs to determine at least one UE identifier that occurs at a highest frequency for all of the coordinate pairs, wherein the set of UE identities includes an identity of at least one UE that was handed over to or from the at least one cell, and wherein the received identity of the at least one UE in idle mode is in the set of UE identities.

20. The system of claim 19, wherein the first list includes UEs that are registered to cellular networks that are controlled by different operators.

* * * * *